UNITED STATES PATENT OFFICE.

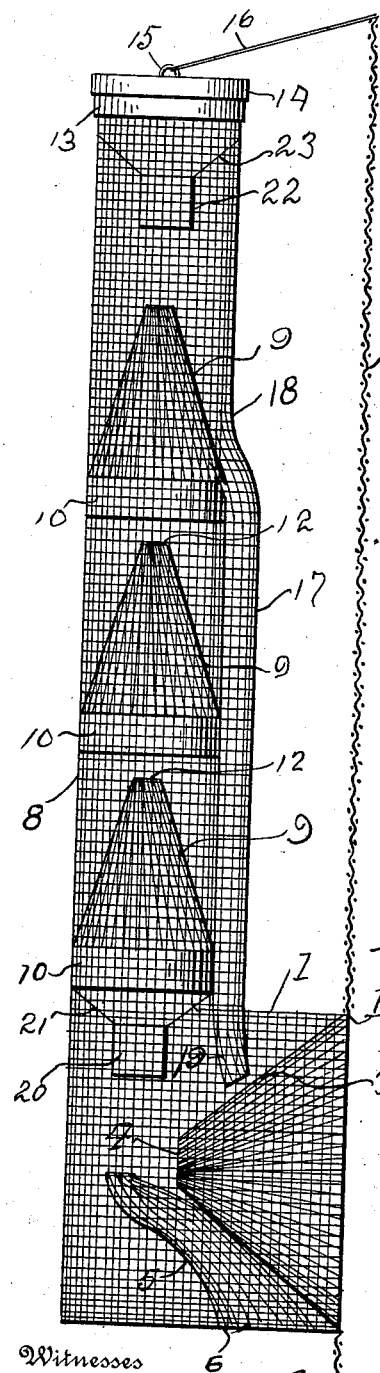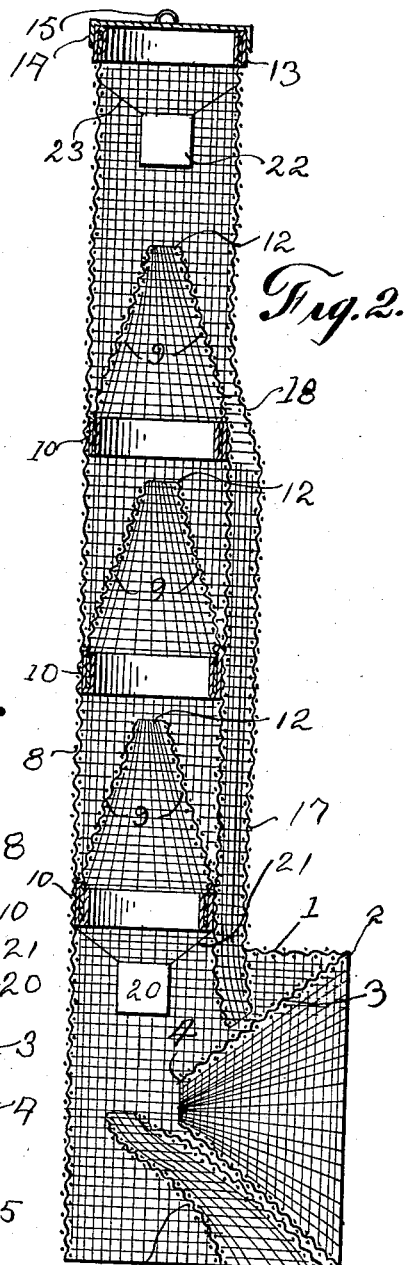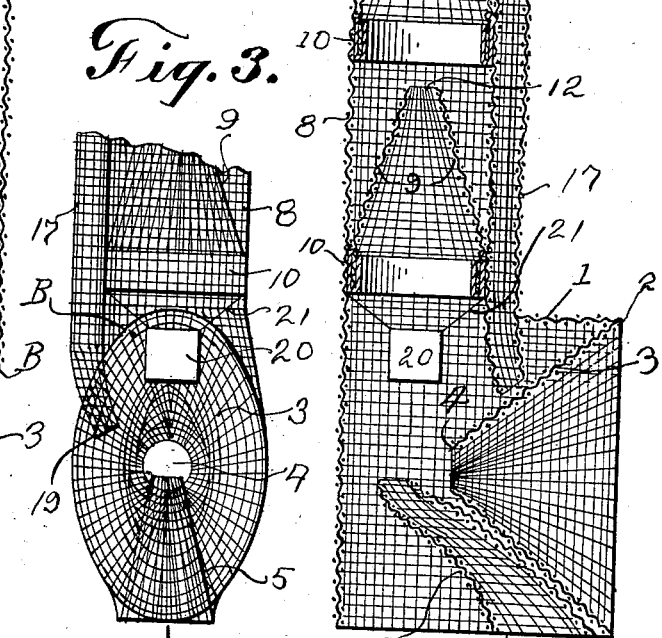

WILLIAM I. WAGGONER, OF BURLINGTON, INDIANA.

FLY-TRAP.

1,073,190. Specification of Letters Patent. Patented Sept. 16, 1913.

Application filed October 17, 1912. Serial No. 726,340.

*To all whom it may concern:*

Be it known that I, WILLIAM I. WAGGONER, a citizen of the United States, residing at Burlington, in the county of Carroll and State of Indiana, have invented certain new and useful Improvements in Fly-Traps, of which the following is a specification.

My invention relates to traps for catching flies and other insects and has for one of its objects the provision of a trap adapted to be mounted on a screen door or window and provided with means by which the insects on either side of the screen fabric may be lured into the trap and kept imprisoned.

Another object of my invention is the provision of a fly trap adapted to be mounted as stated above, and having in combination therewith a trail arranged along one side of the trap into which the insects that have already been imprisoned may proceed and serve as a lure to induce other insects to enter the trap.

My invention will be described in detail hereinafter and illustrated in the accompanying drawings in which:—

Figure 1 is a side view in elevation of my improved trap showing it mounted on the screen fabric of a door or window; Fig. 2, a vertical longitudinal sectional view of the trap; and, Fig. 3, a fragmental front view of the entrance to the trap.

In the drawings similar reference characters will be used to represent corresponding parts throughout the several views.

My improved trap is, as stated above, adapted to be mounted upon the screen fabric of a screen door or window such as A in Fig. 1, an opening being made in said screen fabric as indicated at B to receive the mouth of the trap, said trap mouth being secured to the screen fabric around the edges of the opening B in any suitable manner.

The trap is constructed of screen fabric and comprises an entrance chamber 1 having an opening 2 in which is secured a conical shaped entrance 3 having a reduced opening 4 admitting into the chamber 1, the walls of said opening 2 being removably secured to the walls of the opening B in the screen fabric, said chamber 1 extending exteriorly of the screen door or window. Mounted in the lower portion of the chamber 1 is another entrance consisting of an inclined conical member 5 secured in the walls of an opening 6, and having a reduced orifice opening into the interior of the chamber 1.

Rising from the upper side of the chamber 1 is a cylindrical chamber 8 having mounted therein a series of conical passage-ways 9, having their larger ends secured in rings 10, that are formed of strips of metal bent on themselves and the edges of the conical passage-ways clamped between the parallel portions of said rings formed thereby. The upper ends of the conical passage-ways 9 have the restricted openings 12 through which the insects crawl in proceeding to the upper portion of the trap, it being common knowledge that flies naturally proceed in an upward direction while crawling on a substantially vertical surface.

The upper edge of the cylindrical chamber 8 is secured between the folded back portions of a strip of metal bent into a circular shape and forming a ring 13 between the bent back sides of which is clamped the upper edge of the cylindrical chamber 8, and 14 indicates a flanged cap to close the opening formed by said ring 13. Secured to said cap 14 is a loop or staple 15 to which is adapted to be secured a cord or wire 16 to one of its terminals and having its other terminal adapted to be secured to the upper portion of the screen door or window to help support the upper end of the trap.

Mounted on one side of the cylindrical chamber 8 is a tubular member 17 communicating with the cylindrical chamber 8 above the uppermost passage-way 9 as shown at 18, and having its lower extremity extended into the chamber 1 as shown at 19, said tubular member 17 being adapted to permit the imprisoned insects to proceed therethrough and serve as a lure to the flies without the trap to enter the trap, and at the same time preventing said imprisoned flies from leaving the trap, as the lower extremity 19 is closed and the insects within said tubular member 17 return therethrough into the upper end of the trap.

20 indicates a receptacle secured below the lowermost passage-way 9 in the chamber 1 by means of flexible members 21, that is adapted to contain any suitable bait to entice the flies within the chamber 1, and 22 indicates a similar receptacle mounted at the upper portion of the cylindrical chamber 8, by means of flexible members 23, that is adapted to contain a similar bait to entice the flies to crawl up to the upper portion of the trap.

In use, it will be apparent that by securing my improved trap to the screen fabric A, as stated, and having the trap extending outwardly of the door or window, the insects on the inner side of the screen door or window in endeavoring to get out of the window will crawl into the opening 2 of the trap and proceed along the conical entrance 3 and through the restricted opening 4 into the chamber 1. Likewise, the insects on the outside of the screen in crawling up the screen and endeavoring to gain entrance to the room will enter the opening 6 in the under side of the chamber 1 and proceed through the conical entrance 5 and restricted opening 7 into the chamber 1. It will also be apparent that the insects within the chamber 1 will be lured from the openings 4 and 7 in the entrance by means of the bait within the receptacle 20, and will each leaving the bait in the receptacle 20 proceed upwardly through the conical passage-ways. Few, if any of them, will be able to return to the lowermost portion of the trap, and will be prevented from doing so to a large extent by the bait within the receptacle 22 to the uppermost portions of the cylindrical chamber 8. As heretofore stated, some of the insects in the uppermost portions of the cylindrical chamber 8 will find the opening 18 to the tubular member 17, and by proceeding up and down therein will serve as a lure to entice the flies without the trap to enter it.

After a sufficient number of flies have entered the trap, it may be removed from the screen fabric and the flies destroyed in any manner desired and the trap emptied by removing the cap 14 from the upper end of the cylindrical chamber 8.

Having thus described my invention what I claim is:—

An attachment for a screen door or window having an opening therein, consisting of a fly trap comprising a chamber having an opening therein, the walls of said opening being adapted to be removably secured in the screen door or window, a conical entrance extending inwardly of the opening in the chamber aforesaid and having reduced orifices extending into said chamber, said chamber being provided with another opening in its lower portion, a conical entrance extending inwardly of the chamber from said opening and having a reduced orifice communicating with the interior of the chamber, a cylindrical chamber extending upwardly from the first mentioned chamber, conical shaped passageways arranged in series in said cylindrical chamber, and having reduced orifices extending upwardly thereof, a tubular member mounted on one side of said cylindrical chamber and communicating therewith above the upper of the said conical passageways, the lower extremity of the said tubular member extending into the first mentioned chamber, a bait receptacle suspended in the first mentioned chamber, a bait receptacle suspended in the upper portion of said cylindrical chamber, and a removable cap mounted on the upper extremity of the cylindrical chamber.

In testimony whereof I affix my signature in presence of two witnesses.

W. I. WAGGONER.

Witnesses:
J. R. LANDIS,
DELLA ZINN.

---

Copies of this patent may be obtained for five cents each, by addressing the "Commissioner of Patents, Washington, D. C."